US012620075B2

(12) United States Patent
Chavali et al.

(10) Patent No.: US 12,620,075 B2
(45) Date of Patent: May 5, 2026

(54) TARGETED APPLICATION OF DEEP LEARNING TO AUTOMATED VISUAL INSPECTION EQUIPMENT

(71) Applicant: AMGEN INC., Thousand Oaks, CA (US)

(72) Inventors: Neelima Chavali, Newbury Park, CA (US); Thomas C. Pearson, Newbury Park, CA (US); Manuel A. Soto, Caguas, PR (US); Jorge Delgado Torres, Caguas, PR (US); Roberto C. Alvarado Rentas, Caguas, PR (US); Javier O. Tapia, Gurabo, PR (US); Sandra Rodriguez-Toledo, Trujillo Alto, PR (US); Eric R. Flores-Acosta, San Juan, PR (US); Osvaldo Perez, Guaynabo, PR (US); Brenda A. Torres, San Juan, PR (US)

(73) Assignee: Amgen Inc., Thousand Oaks, CA (US)

( * ) Notice: Subject to any disclaimer, the term of this patent is extended or adjusted under 35 U.S.C. 154(b) by 323 days.

(21) Appl. No.: 17/775,036

(22) PCT Filed: Nov. 6, 2020

(86) PCT No.: PCT/US2020/059293

§ 371 (c)(1),
(2) Date: May 6, 2022

(87) PCT Pub. No.: WO2021/092297

PCT Pub. Date: May 14, 2021

(65) Prior Publication Data

US 2022/0398715 A1     Dec. 15, 2022

Related U.S. Application Data

(60) Provisional application No. 62/949,667, filed on Dec. 18, 2019, provisional application No. 62/932,413, filed on Nov. 7, 2019.

(51) Int. Cl.
G06T 7/00 (2017.01)

(52) U.S. Cl.
CPC .. G06T 7/0004 (2013.01); *G06T 2207/20081* (2013.01); *G06T 2207/20084* (2013.01); *G06T 2207/30108* (2013.01)

(58) Field of Classification Search
CPC ......... G06T 7/0004; G06T 2207/20081; G06T 2207/20084; G06T 2207/30108; G06V 20/69; G01N 21/8803; G06N 3/08
(Continued)

(56) References Cited

U.S. PATENT DOCUMENTS

| | | | | | |
|---|---|---|---|---|---|
| 2002/0152632 | A1* | 10/2002 | Miyazaki | ............... | B65G 29/00 34/245 |
| 2006/0000968 | A1* | 1/2006 | Katayama | .......... | G01N 21/9054 250/223 B |

(Continued)

FOREIGN PATENT DOCUMENTS

| | | |
|---|---|---|
| CN | 107316297 A | 11/2017 |
| CN | 110337258 A | 10/2019 |

(Continued)

OTHER PUBLICATIONS

Automated Machine Vision System for Liquid Particle Inspection of Pharmaceutical Injection (Year: 2018).*

(Continued)

*Primary Examiner* — Charlotte M Baker
*Assistant Examiner* — Pardis Sohraby
(74) *Attorney, Agent, or Firm* — Lauren Mangano Drenkard

(57) ABSTRACT

In a method for enhancing accuracy and efficiency in automated visual inspection of vessels, a vessel containing a sample is oriented such that a line scan camera has a profile view of an edge of a stopper of the vessel. A plurality of (Continued)

images of the edge of the stopper is captured by the first line scan camera while spinning the vessel, where each image of the plurality of images corresponds to a different rotational position of the vessel. A two-dimensional image of the edge of the stopper is generated based on at least the plurality of images, and pixels of the two-dimensional image are processed, by one or more processors executing an inference model that includes a trained neural network, to generate output data indicative of a likelihood that the sample is defective.

17 Claims, 9 Drawing Sheets

(58) Field of Classification Search
USPC .......................................................... 382/141
See application file for complete search history.

(56) References Cited

U.S. PATENT DOCUMENTS

| | | | |
|---|---|---|---|
| 2006/0072111 A1 | 4/2006 | Budd et al. | |
| 2006/0256338 A1 | 11/2006 | Gratton et al. | |
| 2006/0257993 A1 | 11/2006 | McDevitt et al. | |
| 2008/0230720 A1 | 9/2008 | Nielsen | |
| 2008/0291438 A1 | 11/2008 | Akkerman et al. | |
| 2009/0154789 A1* | 6/2009 | Wolfe | G01N 21/958 |
| | | | 382/141 |
| 2011/0007148 A1 | 1/2011 | Hermann et al. | |
| 2016/0335756 A1* | 11/2016 | O'Connor | G06T 7/0012 |
| 2016/0379378 A1* | 12/2016 | Milne | G06T 7/246 |
| 2018/0231760 A1 | 8/2018 | Fradkin et al. | |
| 2018/0357757 A1* | 12/2018 | Kuwasako | G01N 21/8851 |
| 2019/0066288 A1* | 2/2019 | Dudzik | G01N 21/8851 |
| 2019/0283445 A1* | 9/2019 | Sones | B41J 11/0095 |
| 2020/0005141 A1* | 1/2020 | Ambikapathi | G06N 20/00 |
| 2020/0005422 A1* | 1/2020 | Subramanian | G06T 7/194 |

FOREIGN PATENT DOCUMENTS

| | | | |
|---|---|---|---|
| EP | 597639 A1 | 5/1994 | |
| JP | H06-505333 A | 6/1994 | |
| JP | 2005-098832 A | 4/2005 | |
| JP | 2017219312 A | 12/2017 | |
| JP | 2018005639 A | 1/2018 | |
| JP | 2018105690 A | * 7/2018 | |
| JP | 2019-504996 A | 2/2019 | |
| JP | 2019174346 A | 10/2019 | |
| WO | WO-92/14142 A1 | 8/1992 | |
| WO | 2017123838 A1 | 7/2017 | |
| WO | WO-2017/132162 A1 | 8/2017 | |
| WO | WO-2018160288 A1 | 9/2018 | |

OTHER PUBLICATIONS

European Patent Application No. 20817138.9, Communication Pursuant to Article 93(3) EPC, dated May 7, 2024.

Tsay et al., "Automating Visual Inspection of Lyophilized Drug Products With Multi-Input Deep Neural Networks", 2019 IEEE 15th International Conference on Automation Science and Engineering (CASE), Aug. 22, 2019, pp. 1802-1807.

Ali et al., "A Cascading Fuzzy Logic With Image Processing Algorithm-based Defect Detection for Automatic Visual Inspection of Industrial Cylindrical Object's Surface", The International Journal of Advanced Manufacturing Technology, vol. 102, No. 1, Dec. 19, 2018, pp. 81-94.

Search Report and Written Opinion in International Application No. PCT/US2020/059293 dated Feb. 24, 2021, 14 pages.

Forcinio, Improving Visual Inspection, BioPharm International, 31(4):32--5 (Apr. 2018).

Hoffman, Automated inspection of Pharmaceutical Products, Pharmaceutical Technology, 34(11): 2 pages (2010).

Eurasian Paetnt Application No. 202291385, Office Action, mailed Feb. 28, 2023.

Japanese Patent Application No. 2022-524988, Notice of Reasons for Refusal, dated Aug. 20, 2024.

Zhang et al., Automated machine vision system for liquid particle inspection of pharmaceutical injection, IEEE Transactions on Instrumentation and Measurement, 67(6):1278-97 (Feb. 2018).

"Container appearance inspection at high-speed and high-precision Finet inspection system", Food Packaging, Japan, Nippo I.B Co., Ltd., 52(4):34 (Apr. 2008).

Japanese Patent Application No. 2022-524988, Notice of Reasons for Rejection, mailed Aug. 20, 2024.

Chinese Patent Application No. 202080076841.4, Office Action, dated Nov. 14, 2025.

Office Action from Japanese Patent Application No. 2025-053078 mailed Jan. 20, 2026.

* cited by examiner

322

310

314

330

312

312

310

300

700

720

800

TARGETED APPLICATION OF DEEP LEARNING TO AUTOMATED VISUAL INSPECTION EQUIPMENT

FIELD OF DISCLOSURE

The present application relates generally to automated visual inspection (AVI) systems for pharmaceutical or other products, and more specifically to techniques for detecting and distinguishing particles and other objects (e.g., bubbles) in vessels filled with samples (e.g., solutions).

BACKGROUND

In certain contexts, such as quality control procedures for manufactured drug products, it is necessary to examine samples (e.g., vessels/containers such as syringes or vials, and/or their contents such as fluid or lyophilized drug products) for defects. The acceptability of a particular sample, under the applicable quality standards, may depend on metrics such as the type and/or size of container defects (e.g., chips or cracks), or the type, number and/or size of undesired particles within a drug product (e.g., fibers), for example. If a sample has unacceptable metrics, it may be rejected and/or discarded.

To handle the quantities typically associated with commercial production of pharmaceuticals, the defect inspection task has increasingly become automated. However, automated detection of particulates in solution presents a special challenge within the pharmaceutical industry. High detection accuracy is generally difficult to achieve, and becomes even more difficult as higher viscosity solutions inhibit particle motion, which can otherwise be indicative of the particle type. For protein-based products with formulations that release gases that promote the formation of bubbles, conventional particle detection techniques can result in a particularly high rate of false rejects. For example, such techniques may have difficulty distinguishing these bubbles (which may cling to the vessel) from heavy particles that tend to settle/rest against a portion of the vessel (e.g., against a plunger of a syringe filled with a solution).

Moreover, the specialized equipment used to assist in automated defect inspection has become very large, very complex, and very expensive. A single piece of commercial line equipment may include numerous different AVI stations that each handle different, specific inspection tasks. As just one example, the Bosch® Automatic Inspection Machine (AIM) 5023 commercial line equipment, which is used for the fill-finish inspection stage of drug-filled syringes, includes 14 separate visual inspection stations, with 16 general inspection tasks and numerous cameras and other sensors. As a whole, such equipment may be designed to detect a broad range of defects, including container integrity defects such as large cracks or container closures, cosmetic container defects such as scratches or stains on the container surface, and defects associated with the drug product itself such as liquid color or the presence of foreign particles. Due to the above-noted challenges associated with particle detection and characterization, however, such equipment can require redundancies between AVI stations. In the case of the Bosch® AIM 5023 line equipment, for example, the relatively poor performance of a "stopper edge" inspection station (for detecting and distinguishing heavy particles resting on the dome of a syringe plunger) necessitates that particle inspection also be performed at another, "stopper top" AVI station with additional cameras, in order to achieve acceptable overall levels of particle inspection accuracy.

This increases the complexity and cost of the equipment, and/or requires that the "stopper top" AVI station be adapted to perform multiple inspection tasks rather than being optimized for a single task (e.g., detecting defects in the stopper itself).

SUMMARY

Embodiments described herein relate to systems and methods in which deep learning is applied to a particular type of AVI station (e.g., within commercial line equipment that may include multiple AVI stations) to synergistically provide substantial improvements to accuracy (e.g., far fewer false rejects and/or false positives). Additionally or alternatively, the described systems and methods may allow advantageous modifications to other AVI stations (e.g., within the same commercial line equipment), such as by allowing other AVI stations to focus exclusively on other tasks, and/or by eliminating other AVI stations entirely.

In particular, deep learning is applied to an AVI station that utilizes one or more line scan cameras (e.g., CMOS line scan camera(s)) to detect and distinguish objects (e.g., gas-filled bubbles versus glass and/or other particles) that are resting or otherwise positioned on or near an edge of a stopper of a vessel containing a sample (e.g., a liquid solution drug product). For example, the AVI station may utilize the line scan camera(s) to detect and distinguish objects that are positioned on or near the surface of a syringe plunger dome in contact with a liquid sample within the syringe. The line scan camera(s) may capture multiple line images as the AVI station rotates/spins the vessel at least one revolution (360 degrees), after which a processing device or component within (or communicatively coupled to) the AVI station generates a two-dimensional image from the multiple line images.

The AVI station or external processing component provides pixel values of the two-dimensional image (e.g., normalized pixel intensity values) to a trained neural network, which infers whether the vessel sample is unacceptable (e.g., contains unacceptable numbers, sizes and/or types of particles within the imaged area). The neural network may be trained with supervised learning techniques, for example, using a wide array of two-dimensional images of samples that are known (and labeled) to have acceptable or unacceptable numbers, types, sizes, etc., of particles and/or gas-filled bubbles. The selection and classification of the images used to train the neural network are critical for the performance in the inference phase. Further, unexpected conditions should be anticipated and included in the training images in order to avoid the acceptance of defective units. Importantly, the trained neural network, or a larger inference model that includes the neural network, may be "locked" prior to qualification, such that the model cannot be modified (e.g., further trained) without re-qualification. Acceptance criteria preferably should be established and pre-approved to ensure the system performs equal or better than with manual visual inspection.

If the AVI station (or a communicatively coupled processing device) indicates that the sample is defective, the AVI station, or commercial line equipment containing the AVI station, causes the vessel/sample to be physically conveyed to a reject area, where the sample may be discarded/destroyed or forwarded for further inspected (e.g., manual inspection). The vessel/sample may be conveyed directly to the eject/reject area (e.g., bin), or may first pass through one or more other AVI stations, depending on the embodiment. If the inference model does not indicate that the sample is defective, the AVI station or the commercial line equipment may cause the vessel/sample to be conveyed either directly to an area designated for accepted products, or to a next AVI station for further inspection (e.g., one or more AVI stations that are designed to detect other types of sample and/or vessel defects).

BRIEF DESCRIPTION OF THE DRAWINGS

The skilled artisan will understand that the figures described herein are included for purposes of illustration and do not limit the present disclosure. The drawings are not necessarily to scale, and emphasis is instead placed upon illustrating the principles of the present disclosure. It is to be understood that, in some instances, various aspects of the described implementations may be shown exaggerated or enlarged to facilitate an understanding of the described implementations. In the drawings, like reference characters throughout the various drawings generally refer to functionally similar and/or structurally similar components.

DETAILED DESCRIPTION

The various concepts introduced above and discussed in greater detail below may be implemented in any of numerous ways, and the described concepts are not limited to any particular manner of implementation. Examples of implementations are provided for illustrative purposes.

Figure 1:
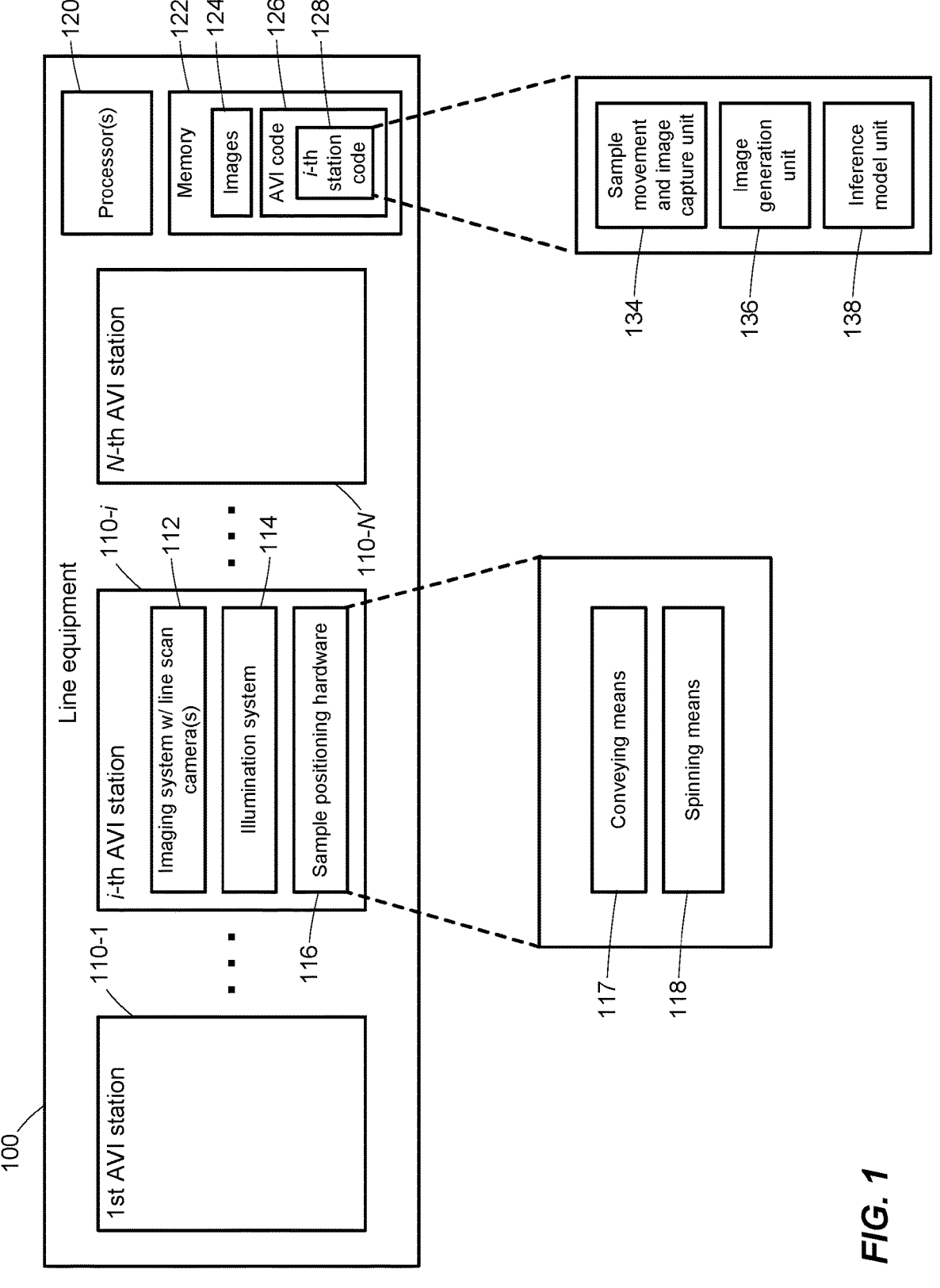
FIG. 1 is a simplified block diagram of example line equipment that may implement the imaging and deep learning techniques described herein.

FIG. 1 is a simplified block diagram of example AVI line equipment 100 that may implement the techniques described herein. The line equipment 100 may be any production-grade equipment with N (N≥1) AVI stations 110-1 through 110-N (also referred to collectively as AVI stations 110), for example. To provide a more specific example, the line equipment 100 may be a modified version of the Bosch® Automatic Inspection Machine (AIM) 5023 commercial line equipment, which is discussed further below with reference to FIG. 2. Each of the AVI stations 110 may be responsible for capturing images to be used for inspection of a different aspect of vessels (e.g., syringes, vials, etc.), and/or samples within the vessels (e.g., a liquid solution drug product). For example, a first AVI station 110-1 may capture images of a top view of syringes, vials or other vessels to inspect for cracks or chips, a second AVI station 110-2 (not shown in FIG. 1) may capture side view images to inspect the entire sample within the vessels for foreign particles, and so on.

FIG. 1 shows, also in simplified block diagram form, the general components of the i-th AVI station 110-i, where i may be any integer from 1 to N. The AVI station 110-i is configured to visually and automatically inspect the sample (vessel contents), specifically in the area where the sample meets/contacts the edge of a stopper of the vessel. The stopper may be the plunger of a syringe, for example, or a cap or plug sealing the opening of a vial, etc. To perform this inspection, the AVI station 110-i includes an imaging system 112, an illumination system 114, and sample positioning hardware 116. It is understood that the other AVI stations 110 (if any) may generally have similar types of components (e.g., imaging systems, illumination systems, and sample positioning hardware), but potentially with different component types and configurations, as appropriate for the purpose of each given station 110.

The imaging system 112 includes at least one line scan camera and, potentially, associated optical components (e.g., additional lenses, mirrors, filters, etc.), to capture line images of each sample (drug product). Each of the line scan camera(s) may be a CMOS line scan camera, for example. For ease of explanation, much of the following description will refer to only a single line scan camera. However, it is understood that multiple line scan cameras may be used. For example, each of two line scan cameras may image a different vessel/sample at the same time, in parallel fashion, to increase throughput.

The illumination system 114 includes one or more lighting devices to illuminate each sample while the sample is being imaged by the line scan camera. The lighting device(s) may include one or more light-emitting diodes (LEDs), such as an LED array arranged as a backlight panel, for example.

The sample positioning hardware 116 may include any hardware that holds (or otherwise supports) and moves the vessels for the AVI station 110-i. In the embodiment of FIG. 1, the sample positioning hardware 116 includes at least conveying means 117, for orienting each vessel such that the line scan camera of imaging system 112 has a profile view of an edge of a stopper of the vessel, and spinning means 118, for spinning each vessel (e.g., rotating about the central axis of the vessel) while the line scan camera captures line images. The conveying means 117 may include a motorized rotary table, starwheel or carousel, a robotic arm, and/or any other suitable mechanism for orienting (e.g., moving and positioning) each vessel. The spinning means 118 may include a motorized spinning mechanism (e.g., the components of the Bosch® AIM 5023 that provide the "direct spin" feature for a syringe, as discussed below with reference to FIG. 2), for example. As discussed further below, after the conveying means 117 properly positions/orients a given vessel, the spinning means 118 spins the vessel such that the line scan camera can capture line images that collectively cover a full 360 degree view of the stopper in the area where the stopper contacts the sample.

In some embodiments, the sample positioning hardware 116 also includes hardware for inverting each vessel (e.g., to ensure that the stopper is positioned beneath the sample when imaging occurs, such that heavy particles are likely to be resting directly on top of the stopper), and/or for agitating the sample contained in each vessel. In other embodiments, certain aspects of properly orienting each vessel (e.g., vessel inversion) occur at an earlier AVI station 110, between earlier AVI stations 110, or prior to handling by line equipment 100, etc. Various example orientations of the line scan camera relative to a vessel/sample, at the time when the line scan camera captures images of the spinning sample, will be discussed below with reference to FIGS. 3A and 3B.

The line equipment 100 also includes one or more processors 120 and a memory 122. Each of the processor(s) 120 may be a programmable microprocessor that executes software instructions stored in the memory 122 to execute some or all of the software-controlled functions of the line equipment 100 as described herein. Alternatively, or in addition, one or more of the processor(s) 120 may be other types of processors (e.g., application-specific integrated circuits (ASICs), field-programmable gate arrays (FPGAs), etc.), and some of the functionality of the processor(s) 120 as described herein may instead be implemented in hardware. The memory 122 may include one or more volatile and/or non-volatile memories. Any suitable memory type or types may be included in the memory 122, such as read-only memory (ROM), random access memory (RAM), flash memory, a solid-state drive (SSD), a hard disk drive (HDD), and so on. Collectively, the memory 122 may store one or more software applications, the data received/used by those applications, and the data output/generated by those applications.

The processor(s) 120 and memory 122 collectively constitute processing means for controlling/automating the operation of the AVI stations 110, and for processing images captured/generated by the AVI stations 110 to detect the respective types of defects for the vessels and/or vessel contents (e.g., drug product samples). Specifically for the AVI station 110-i, the processing means (120 and 122) is configured to (1) cause the imaging system 112 to capture images of a stopper edge of the vessel at appropriate times while the spinning means 118 spins the vessel, (2) generate a two-dimensional image of the stopper edge based on the set of images captured by the imaging system 112, and (3) process pixels (e.g., pixel intensity values) of the resulting two-dimensional image using a trained neural network to generate output data, as will be discussed in further detail below. In an alternative embodiment, the functionality of processor(s) 120 and/or memory 122 is distributed among N different processing units and/or memory units, respectively, that are each specific to a different one of the AVI stations 110-1 through 110-N. In yet another embodiment, some of the functionality of processor(s) 120 and memory 122 (e.g., for conveyance, spinning, and/or imaging of samples) is distributed among the AVI stations 110, while other functionality of processor(s) 120 and memory 122 (e.g., for generating two-dimensional images from line scan camera images, and/or processing two-dimensional images to detect defects, etc.) is performed at a centralized processing location. In some embodiments, at least a portion of the processor(s) 120 and/or the memory 122 is included in a computing system that is external to (and possibly remote from) the line equipment 100.

The memory 122 stores vessel/sample images 124 captured by the AVI stations 110, and also stores AVI code 126 that, when executed by the processor(s) 120, causes the AVI stations 110 to perform their respective functions as discussed above. For AVI station 110-i, for example, the AVI code 126 includes a respective portion denoted in FIG. 1 as code 128. As an example of one embodiment, code 128 may trigger imaging system 112 to capture line scan images while samples are illuminated by illumination system 114 and spun by spinning means 118, and may control sample positioning hardware 116 to place a vessel in the correct position at the appropriate time. After the images are captured and stored within images 124, code 128 processes the respective images 124 to detect defects associated with station 310-i (e.g., based on the number, size and/or type of particles and/or other objects such as bubbles). As noted above, in some embodiments, the portion of code 128 that processes images may be executed by a different processor, component, and/or device than the portion(s) of code 128 that control conveyance, imaging, spinning, etc.

As seen in FIG. 1, the code 128 for the AVI station 110-i includes a sample movement and image capture unit 134, which generates commands/signals to control the conveying means 117 and spinning means 118 as discussed above. The code 128 also includes an image generation unit 136, which constructs/generates a different two-dimensional image from line scan camera images for each different vessel. Further, the code 128 includes an inference model unit 138, which processes the two-dimensional image generated by the image generation unit 136 using an inference model. The inference model includes (and possibly consists entirely of) a trained neural network, which processes pixels (e.g., intensity values, and possibly color values) to generate output data indicative of whether a particular sample is likely a defect (e.g., likely has unacceptable numbers, sizes and/or types of particles on or near the stopper edge). The neural network and its training, according to various example embodiments, are discussed further below with reference to FIGS. 5 and 6.

Figure 2:
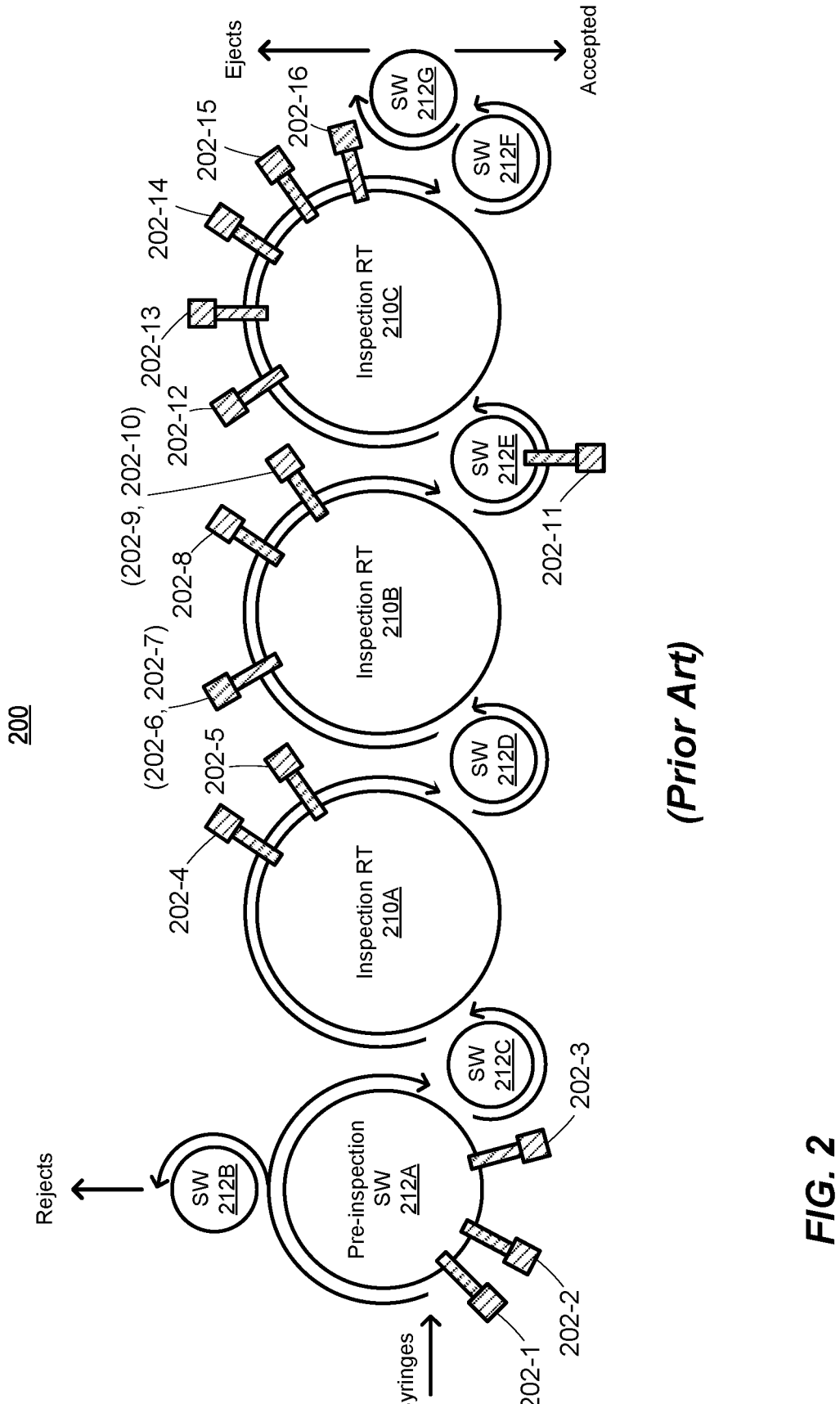
FIG. 2 is a simplified depiction of AVI stations within prior art commercial line equipment.

FIG. 2 depicts, in a simplified manner, existing (prior art) commercial line equipment 200, and more specifically the Bosch® AIM 5023 model. In one embodiment, the line equipment 200 is upgraded or modified using the techniques described herein. That is, the line equipment 200 may, after being so modified (e.g., through field upgrades or a full product redesign), be used as the line equipment 100 of FIG. 1.

In production mode, the equipment 200 (Bosch® AIM 5023) is generally responsible for transporting, inspecting, and sorting syringes filled with solution (drug product). The equipment 200 receives the syringes from a de-nester machine (e.g., the Kyoto® G176 De-Nester) through a series of infeed screws and starwheels, after which automated inspection begins at an infeed (pre-inspection) unit, and continues in a main unit. The infeed and main units have various AVI stations, which are shown in FIG. 2 as stations 202 (with some stations 202 being co-located, as denoted by two reference numbers at a single station). It is understood that FIG. 2 does not attempt to precisely or fully re-create the layout and components of the Bosch® AIM 5023. For example, various starwheels, eject bins, and other components are not shown, and the relative positioning depicted for the various AVI stations 202 is not precisely correct.

In the infeed unit, the line equipment 200 includes three pre-inspection stations along a rotating starwheel 212A: (1) a bent needle shield inspection station 202-1 with charge-coupled device (CCD) cameras (referred to as the "C01-1" and "C01-2" cameras); (2) a flange inspection station 202-2 with a CCD camera (referred to as the "C02" camera); and (3) a stopper presence/color station 202-3 with a CCD camera (referred to as the "C03" camera). These pre-inspections are based on a combination of technologies that include the CCD cameras, stable light sources, and image processors. Syringes identified as defective in any of these stations 202-1 through 202-3 are discharged (via the starwheel 212A and another starwheel 212B) into an eject area/bin without being inverted or transferred to the main unit. The units that pass these inspections, however, are inverted and transported to the main unit of the equipment 200 via a starwheel 212C.

In the main unit, the line equipment 200 includes 13 inspection stations along three rotary tables 210A-210C coupled by two starwheels 212D and 212E. Specifically, two inspection stations are positioned along the rotary table 210A: (1) a turbidity inspection station 202-4 with a CCD camera (referred to as the "C04" camera); and (2) a liquid color inspection station 202-5 with a CCD camera (referred to as the "C05" camera). Five inspection stations are positioned along the rotary table 210B: (1) a body/fiber inspection station 202-6 with CCD cameras (referred to as the "C1-1" and "C1-2" cameras); (2) a body (floating particle) inspection station 202-7 with CCD cameras (referred to as the "C2-1" and "C2-2" cameras); (3) a stopper edge inspection station 202-8 with line scan CMOS cameras (referred to as the "C3-1" and "C3-2" cameras); (4) a stopper side inspection station 202-9 with CCD cameras (referred to as the "C4-1" and "C4-2" cameras); and (5) a stopper top inspection station 202-10 with CCD cameras (referred to as the "C5-1" and "C5-2" cameras). On the starwheel 212E between rotary tables 210B and 210C resides a needle shield color inspection station 202-11 with a CCD camera (referred to as the "C06" camera). Five more inspection stations are positioned along the rotary table 210C: (1) a particle inspection station 202-12 with CCD cameras (referred to as the "C6-1" and "C6-2" cameras); (2) a particle inspection station 202-13 using third generation static division (SDx) sensors (referred to as the "SD1-1" and "SD1-2" sensors); (3) a particle inspection station 202-14 with CCD cameras (referred to as the "C7-1" and "C7-2" cameras); (4) a particle inspection station 202-15 using SDx sensors (referred to as the "SD2-1" and "SD2-2" sensors); and (5) a fill level/air gap inspection station 202-16 with a CCD camera (referred to as the "C8" camera).

The various stations 202-4 through 202-16 of equipment 200 inspect the syringes as the syringes are transported through the main unit. As part of the transport, the syringes are firmly held by free-rotating base attachments and spin caps. On the rotary table 210A, spin motors are arranged in the peripheral area of the table 210A to set proper spin for bubble dissipation and inspection using friction belts that spin the base attachment assemblies. Rotary table 210B is equipped with an air knife ionizer that blows ionized air at the syringe to remove any external particle or dust. On rotary tables 210B and 210C, the base attachment shaft for each syringe location is equipped with a direct-spin function for appropriate inspection of visible particles in solution. Each base attachment can be individually spun around at high or low speed and in a clockwise or counterclockwise direction.

After being processed through all inspection stations of the main unit, the syringes are discharged and sorted into either an "accept" route, which will be transported to another area and collected by a downstream machine (e.g., the Kyoto® G176 Auto Trayer), or to one of three eject areas/ stations. Each eject station has a manually-switchable discharge eject rail. Various rotary tables and/or starwheels may constitute means for conveying a particular vessel to a designated reject area. With respect to the station 202-8, for instance, the starwheels 212E, 212F, 212G and the rotary table 210C, and possibly other starwheel, rails, and/or other mechanisms, may provide means for conveying a vessel/ sample rejected at station 202-8 to the appropriate reject/ eject area.

Referring back to FIG. 1, in one embodiment, the line equipment 100 is modified to become the equipment 200, and the stopper edge inspection station 202-8 is modified to become the AVI station 110-i (e.g., with the line scan camera(s) of imaging system 112 including one or both of the "C3-1" and "C3-2" cameras). Also in this embodiment, the conveying means 117 includes the rotary table 210B (and possibly also a unit that inverts each syringe), and the spinning means 118 includes the free-rotating base attachments, spin caps, spin motors and friction belts discussed above. In such an embodiment, due specifically to the improved accuracy of the stopper edge inspection station 202-8, the stopper top inspection station 202-10 can be omitted, or can also be modified (e.g., to focus on the detection of stopper defects rather than particle inspection, thereby potentially improving the detection accuracy of station 202-10 as well as station 202-8).

Figure 3A:
FIGS. 3A and 3B depict an example vessel in which the edge of a stopper of the vessel is imaged using a line scan camera.
Figure 3B:
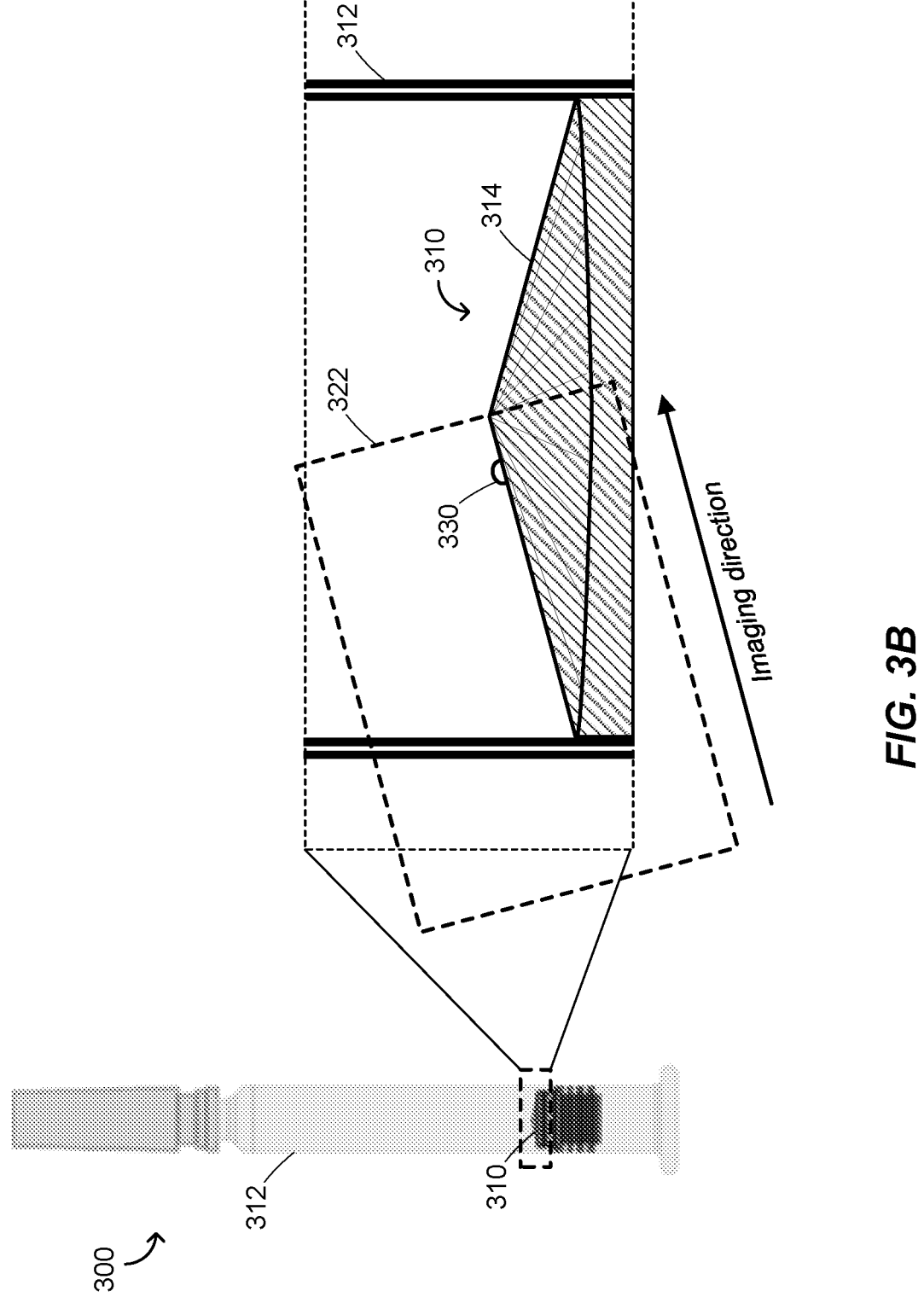

FIGS. 3A and 3B depict an example vessel (syringe) 300 in which a stopper (plunger) 310 within a generally cylindrical wall 312, and particularly the edge of the plunger dome 314 (i.e., where the dome 314 meets the solution in the syringe 300), can be imaged using a line scan camera, such as a line scan camera of the imaging system 112. The wall 312 in which the plunger 310 is disposed may be made of translucent plastic, glass, or any other suitable material. In the particular orientation shown in FIGS. 3A and 3B (i.e., with the plunger 310 on the lower side of the syringe 300), any large air pockets in the sample/solution within the syringe 300 should be well above the plunger dome 314, by the opposite (needle) end of the syringe 300.

As illustrated in the blown-up inset of FIG. 3A, the line scan camera of imaging system 112 is oriented such that, for each rotational position of the syringe 300, the camera captures one vertical line image (also at times referred to herein as simply an "image") corresponding to an area 322. Each line image captures only what is within the very narrow slice/area 322 at the time the image is captured. In FIG. 3A, for example, a first line image might capture one part of an object 330 (e.g., a particle or bubble), while a second line image (if the rotation is in the counter-clockwise direction from the top view) might capture another part of the object 330. As the syringe 300 spins through 360 degrees of rotation (e.g., by spinning means 118), the line scan camera captures enough line images (vertical slices/stacks of pixels) to cover the entire edge of the dome 314 of the plunger 310, so long as the images are captured in small enough rotational increments (e.g., every 1 degree, or 3 degrees, etc., depending on the image width for the line scan camera).

As illustrated in FIG. 3B, the line scan camera may be angled slightly upward relative to the horizontal plane (e.g., relative to the plane of the flange of syringe 300), to match or approximate the slope of the plunger dome 314. In this manner, particles, bubbles or other objects that are at any location along the slope of dome 314 (e.g., near the apex, near the wall 312, or somewhere in between) can be seen/ depicted in sharp relief against the relatively light background provided by the illuminated solution within the syringe 300. Other orientations of the line scan camera relative to the syringe 300 are also possible.

Figure 4:
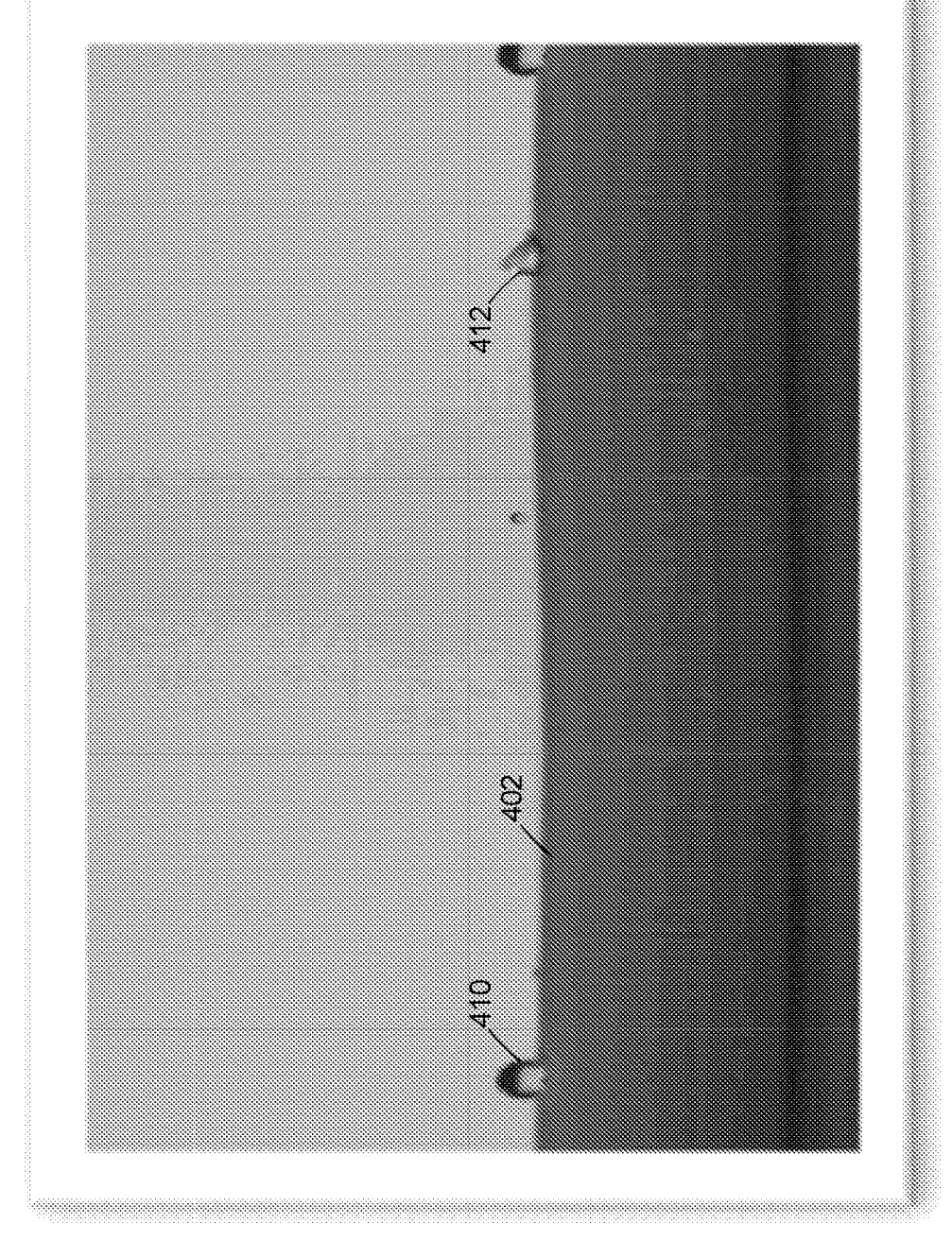
FIG. 4 depicts an example two-dimensional stopper edge image that may generated from line images captured by a line scan camera.

FIG. 4 depicts an example two-dimensional image 400 that may generated from line images (e.g., vertical pixel stacks) captured by a line scan camera (e.g., as the spinning means 118 rotates the syringe 300 of FIG. 3 through at least 360 degrees). The image 400 depicts a stopper edge 402 (with translucent solution above it), and may be generated by the image generation unit 136 of FIG. 1, for example. In the example image 400, two objects 410, 412 resting on the stopper edge 402 (here, a bubble and a glass particle, respectively) can be seen with relative clarity due to the profile view. The stopper edge 402 may be the edge of the plunger dome 314 and the object 410 or 412 may be the object 330 of FIGS. 3A and 3B, for example.

Figure 5:
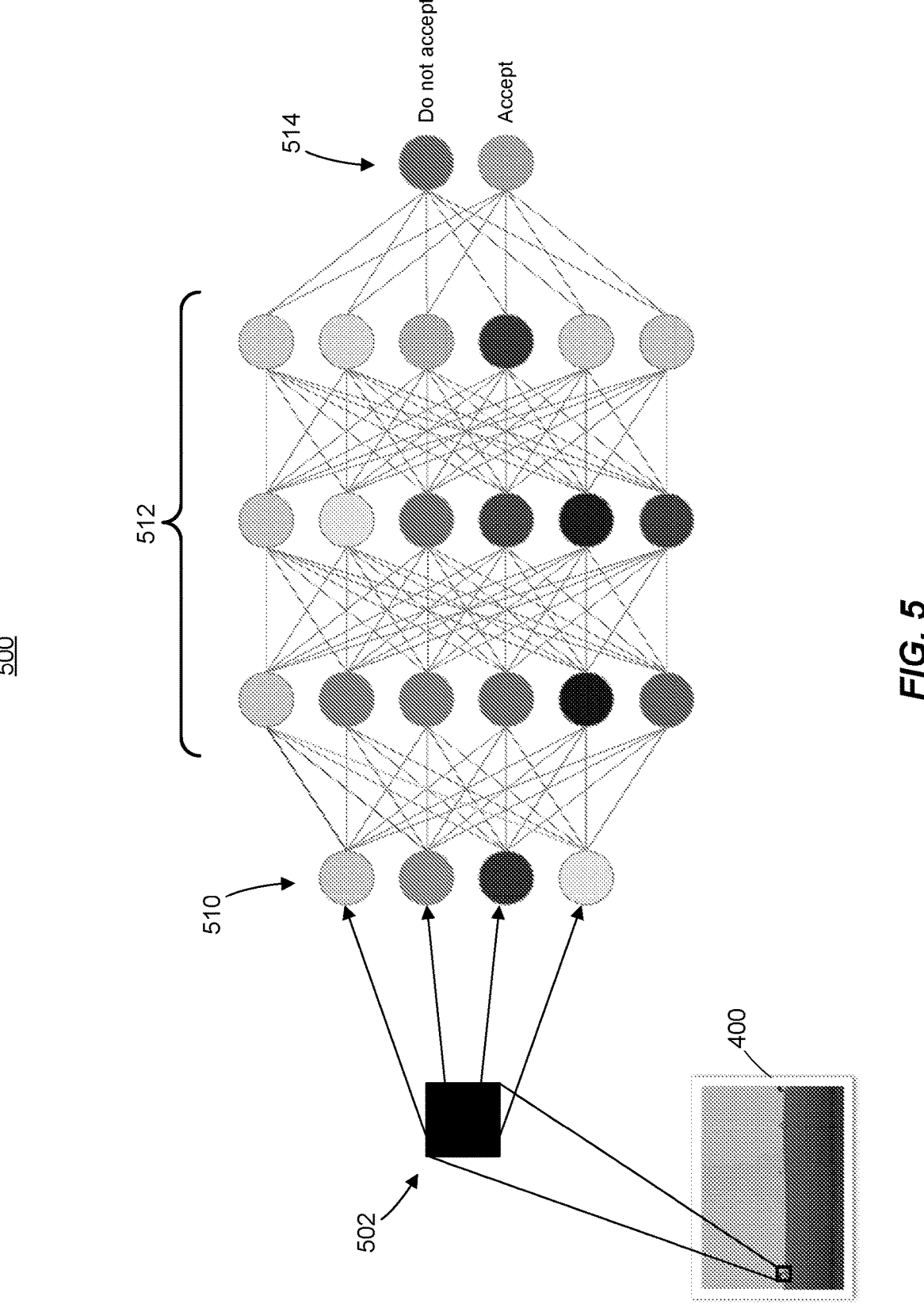
FIG. 5 depicts an example neural network that may be used to infer sample acceptability or unacceptability based on an image such as the two-dimensional image of FIG. 4.

FIG. 5 depicts an example neural network 500 that may be used to infer acceptability or unacceptability based on a two-dimensional image, such as the two-dimensional image 400 of FIG. 4, for example. The neural network 500 may be a trained neural network that forms (or is included within) an inference model implemented by the inference model unit 138 of FIG. 1, for example. The neural network 500 may be a convolutional neural network (CNN), or another suitable type of neural network. As seen in FIG. 5, the example neural network 500 includes an input layer 510, three hidden layers 512, and an output layer 514, each of which includes a number of nodes or "neurons." It is understood that in other embodiments, the neural network 500 may include more or fewer than three hidden layers 512, and/or each layer may include more or fewer nodes/neurons than are shown in FIG. 5.

The neural network 500 is trained to infer whether a particular two-dimensional image (e.g., image 400) is acceptable or unacceptable. It is understood that "acceptable" may or may not mean that the corresponding sample requires no further inspection, and that "unacceptable" may or may not mean that the corresponding sample must be discarded. In the line equipment 100, for example, for the vessel/sample as a whole to pass quality inspection, it may be necessary for the vessel/sample to successfully "pass" the inspection at each of AVI stations 110-1 through 110-N, in which case an "accept" output at AVI station 110-$i$ does not necessarily mean that the corresponding vessel/sample is usable (e.g., suitable for commercial sale or other use). As another example, in some embodiments, an "unacceptable" output at AVI station 110-$i$ means that the vessel/sample must undergo additional (e.g., manual) inspection, without necessarily being rejected or discarded.

Referring to the line equipment 100 of FIG. 1, the inference model unit 138 may pass values (e.g., intensity values and possibly RGB color values) of different pixels 502 of the image 400 to different neurons/nodes of the input layer 510. In some embodiments, the inference model unit 138 may pre-process the pixel values (e.g., intensity and/or color values between 0 and 255, etc.) prior to applying those values to the input layer 510. As one simple example, the inference model unit 138 may convert each pixel value to a normalized value between 0 and 1. Other pre-processing (e.g., averaging of multiple pixel values within pixel subsets, or first cropping out pixels for relatively large areas of the image 400 in which the intensity value does not change by more than a threshold amount and therefore is likely to represent the stopper body, etc.) is also possible.

While FIG. 5 shows only four pixel values being passed to four neurons of input layer 510, in other embodiments more pixel values are passed to more neurons of the input layer 510, such that the neural network 500 processes the image 400 in larger subsets or "chunks." In any event, the inference model unit 138 may, in some embodiments, determine that the image 400 is "acceptable" only if the neural network 500 determines that every pixel subset 502 is individually acceptable. In other, more complex embodiments, the neural network 500 may include more than two neurons at the output layer 514 to reflect intermediate probabilities of non-bubble particles being depicted in a given pixel subset, and the inference model unit 138 may jointly process the results for all pixel subsets to determine whether, as a whole, the image 400 represents an acceptable or unacceptable sample (specifically at the stopper edge). In still other embodiments, the neural network 500 has many neurons at the input layer 510, to process all of the image 400 at once (or all of the pixels within a narrow horizontal band where the stopper meets the sample/solution in the image 400, etc.).

In some embodiments, each line that connects a first neuron to a second neuron in the neural network 500 is associated with a weight, the value of which is determined during the training process (discussed further below). The neural network 500 multiplies the value/output of the "source" neuron (i.e., left side of the connection, as seen in FIG. 5) by that weight, and provides the multiplied value as an input to a function calculated at the "destination" neuron (i.e., right side of the connection, as seen in FIG. 5). Moreover, each neuron of each hidden layer 512 may be associated with an "activation function," which operates on the inputs from the previous layer 510 or 512. For example, each hidden layer 512 neuron may apply the function:

$$a_j^i = \sigma\left(\sum_k \left(a_k^{i-1} * w_{jk}^i\right) + b_j^i\right)$$

where:

$a_j^i$ = activation value of the $j^{th}$ neuron in the $i^{th}$ layer;

$$\sigma(x) = \frac{1}{1 + e^{-x}} \text{(sigmoid function)};$$

$w_{jk}^i$ = weight value between the $k^{th}$ neuron in the $(i-1)^{th}$ layer and the $j^{th}$ neuron in the $i^{th}$ layer; and $b_j^i$ = bias of the $j^{th}$ neuron in the $i^{th}$ layer.

Alternatively, a function other than the sigmoid function may be applied at each neuron of the hidden layers 512, such as a hyperbolic tangent (Tanh) function or a rectified linear unit (ReLU) function, for example.

It is understood that many other embodiments are possible with respect to the arrangement of the neural network 500, the manner in which pixel values are pre-processed (e.g., averaged, segmented, etc.) and/or provided to the neural network 500, and the manner in which outputs of the neural network 500 are processed or otherwise utilized by the inference model unit 138.

The neural network 500 may be trained using supervised learning. More specifically, the neural network 500 may be trained using large sets of two-dimensional images (e.g., each similar to image 400) that depict stopper edges at the solution/stopper interface, with a wide assortment of different conditions. For example, the training images may include many different numbers, sizes, types and positions of particles and/or bubbles, and possibly different solution types (e.g., with different levels of translucence and possibly different viscosities) and/or other variations. Moreover, each training image is labeled in a manner that corresponds to a single correct or "true" output from among the set of available outputs provided by the neural network 500 (e.g., in FIG. 5, "acceptable" or "not acceptable"). The labeling should be carefully done (e.g., by manual inspection and possibly laboratory testing) to ensure that every label is correct. By using training samples with a sufficiently broad range of conditions, the neural network 500 can reliably discriminate between objects that have conventionally been difficult to distinguish, such as heavy particles (e.g., glass particles) versus gas-filled bubbles.

Once the training dataset is complete, the neural network 500 can be trained. Any suitable training technique may be used. For example, the neural network 500 may be trained by, for each training image, using known techniques of forward propagation, error calculation based on the inference results (e.g., mean squared error (MSE)), and back-propagating using a gradient descent technique.

Figure 6:
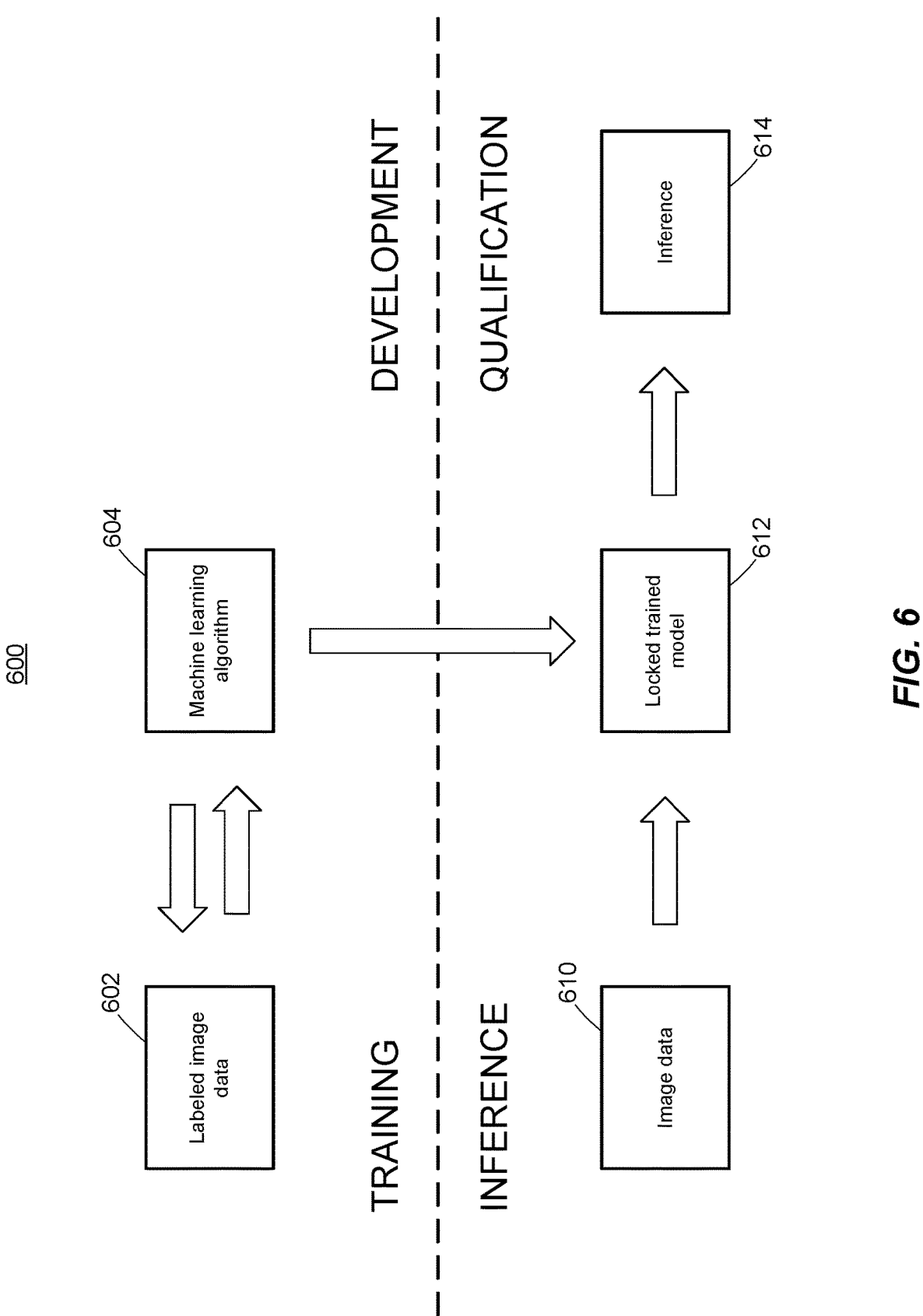
FIG. 6 depicts stages of an example development and qualification process for implementing deep learning with an AVI station.

At a higher level, FIG. 6 depicts an example development and qualification process 600 for implementing deep learning with an AVI station, such as the station 110-i of FIG. 1. In a development phase of the process 600, labeled image data 602 is generated and/or collected for training purposes. The data 602 should be carefully curated, and can include numerous two-dimensional images that depict stopper edges at the solution/stopper interface, with a broad set of different conditions (e.g., particle sizes/types, bubbles, etc.), as described above. At a stage 604, a machine learning algorithm operates on the labeled image data to train a neural network (e.g., the neural network 500, as discussed above).

Once the neural network is trained, in a qualification phase of the process 600, image data 610 (different than the image data 602) is input to the trained model at a stage 612. The "trained model" may be the neural network alone, or may include some additional modeling or processing (e.g., pre-processing of image data prior to inputting the image data into the trained neural network). Throughout qualification, the trained model is "locked." That is, to ensure that qualification results remain valid, the model may not be modified during, or after, the qualification phase. This excludes, for example, refining the neural network with additional training data, thereby avoiding the risk of degrading the performance of the neural network (e.g., if the additional training images were improperly labeled, etc.).

At a stage 614, results of the inference are observed for qualification purposes. If the results indicate an acceptable level of accuracy (e.g., a low enough rate of false positives and/or negatives over a large enough sample size), qualification is successful and the model may be used in production. If the model is modified at any time (e.g., by further training/refining the model using images that portray new conditions), the qualification phase generally must be repeated.

Figure 7:
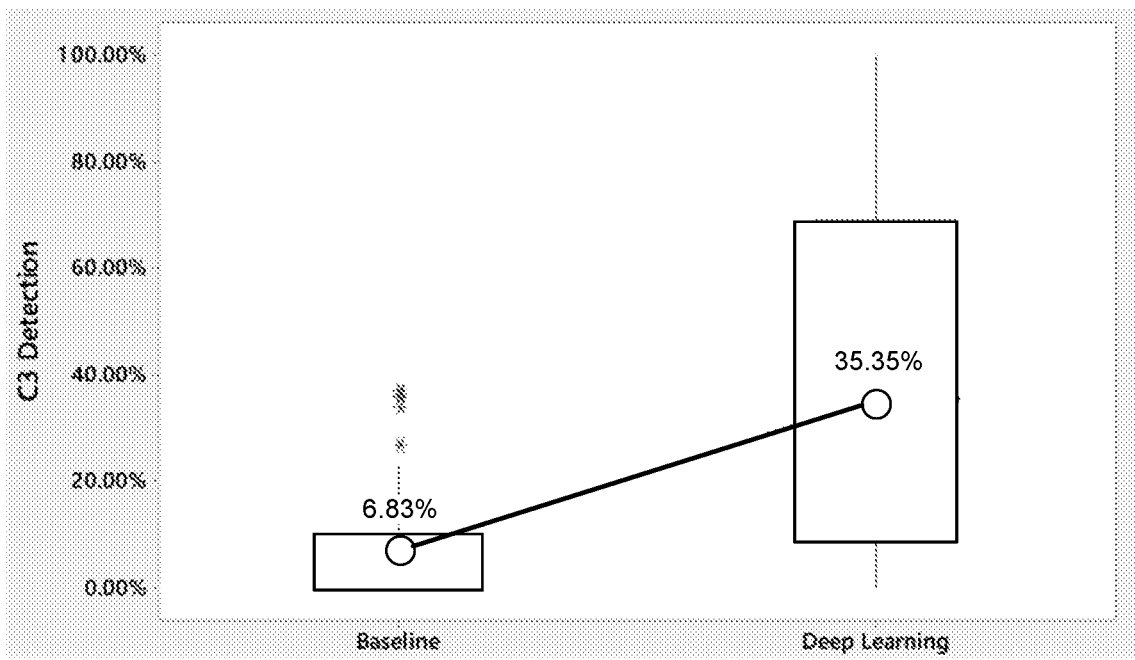
FIG. 7 depicts proof-of-concept results obtained when utilizing deep learning for a particular AVI station.
Figure 7:
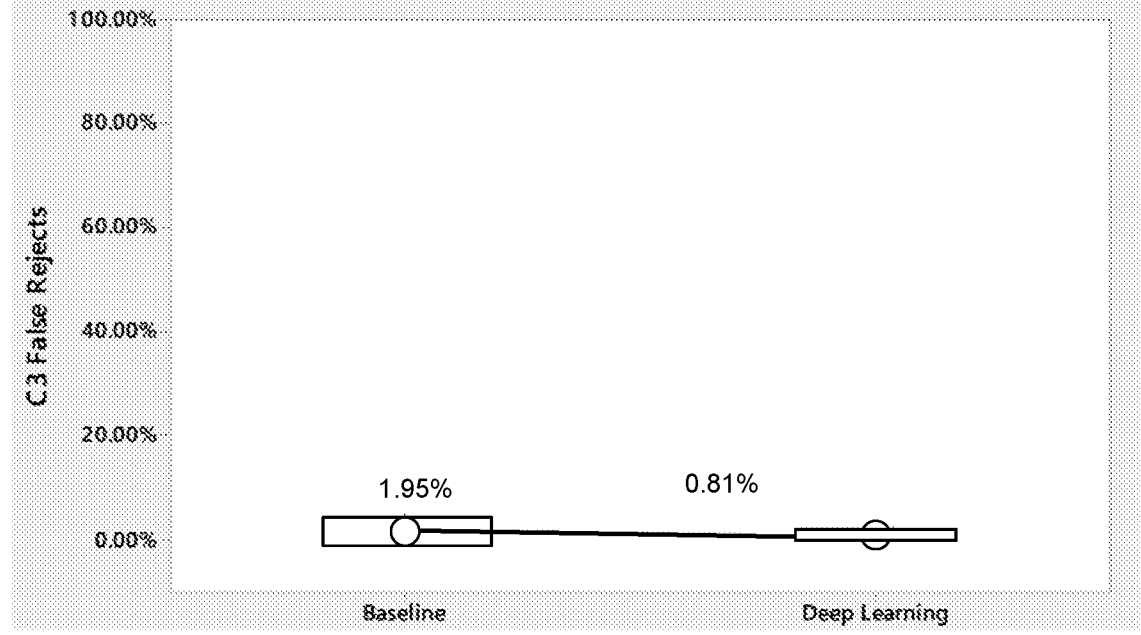

FIG. 7 depicts proof-of-concept results 700, 720 that were obtained utilizing neural-network-based deep learning for a stopper edge inspection station (e.g., similar to the stopper edge inspection station 202-8 of the Bosch® AIM 5023 line equipment in FIG. 2). As seen in the results 700 and the results 720, deep learning provided a roughly 500% (5×) increase in detection capability, and a roughly 50% reduction in false rejects, for this particular station as compared to running the station with no deep learning capability.

Figure 8:
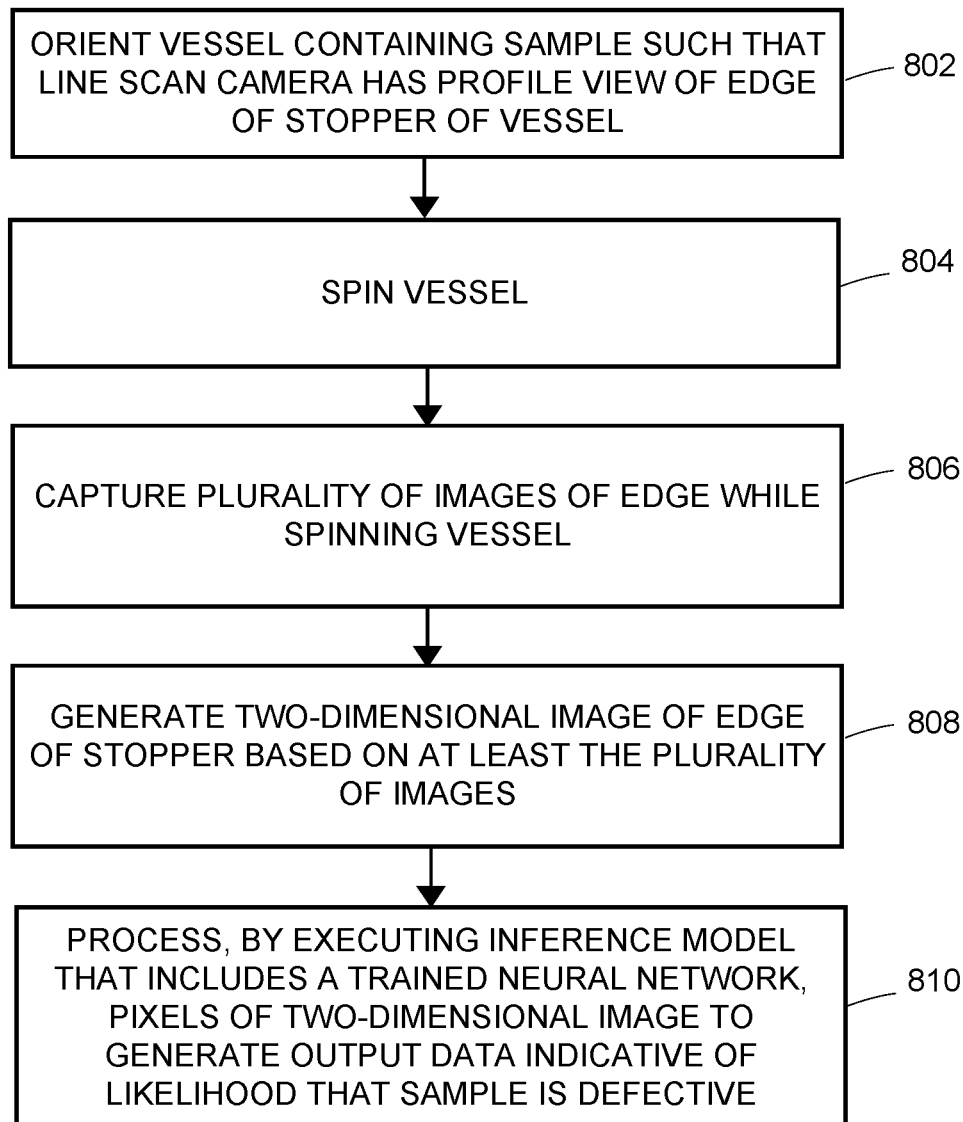
FIG. 8 is a flow diagram of an example method for enhancing accuracy and efficiency in automated visual inspection of vessels.

FIG. 8 is a flow diagram of an example method 800 for enhancing accuracy and efficiency in the automated visual inspection of vessels (e.g., syringes, vials, etc.). The method 800 may be implemented by the AVI station 110-i of FIG. 1, and the processor(s) 120 executing the AVI code 128 in the memory 122, for example.

In the method 800, at block 802, a vessel containing a sample (e.g., liquid solution drug product) is oriented such that a line scan camera has a profile view of an edge of a stopper (e.g., plunger or plug) of the vessel. For example, the vessel may be positioned relative to the line scan camera as indicated in FIGS. 3A and 3B. Block 802 may be performed by the conveying means 117 of FIG. 1, in response to commands generated by the processor(s) 120 executing the sample movement and image capture unit 134, for example.

At block 804, the vessel is spun, e.g., by the spinning means 118 in response to commands generated by the processor(s) 120 executing the sample movement and image capture unit 134. At block 806, and while the vessel is spinning (e.g., for at least one full, 360 degree rotation), a plurality of images of the stopper edge is captured using a line scan camera (e.g., the line scan camera of the imaging system 112). Each image is captured at a different rotational position of the vessel. It is understood that, as the expression is used herein, images may be captured "while a vessel is spinning" even if the images are captured at times when the vessel has come to a standstill. For example, the timing of each image capture by the line scan camera may, in some embodiments, coincide with brief times when the vessel is still (e.g., while the vessel is generally being spun through steps of a 360 degree rotation, but is stationary while between small, discrete rotation intervals). Alternatively, the line scan camera may capture the images at the appropriate rotational positions of the vessel without requiring that the vessel stop spinning/rotating at any point during the line scan. Block 806 may be performed by the line scan camera of imaging system 112, in response to commands generated by the processor(s) 120 executing the sample movement and image capture unit 134, for example.

At block 808, a two-dimensional image of the stopper edge is generated based on at least the plurality of images. Each image of the images captured at block 806 may provide only one (or several, etc.) pixels in a first (e.g., horizontal) axis of the two-dimensional image, but all of the pixels in a second (e.g., vertical) axis of the two-dimensional image. Block 808 may be performed by the processor(s) 120 executing the image generation unit 136, for example.

At block 810, pixels of the two-dimensional image are processed, by executing an inference model that includes a trained neural network (e.g., neural network 500 of FIG. 5), to generate output data indicative of a likelihood that the sample is defective (e.g., based on the number, size and/or types of particles or other objects in the sample, at or near the stopper edge). In some embodiments, block 810 includes processing the pixels of the two-dimensional image by applying intensity values associated with different pixels, or other values derived from the intensity values (e.g., normalized values), to different nodes of an input layer of the trained neural network. Block 810 may be performed by the processor(s) 120 executing the inference model unit 138, for example.

In some embodiments, the method 800 includes one or more additional blocks not shown in FIG. 8.

In one embodiment, for example, the method 800 includes an additional block in which the vessel is caused to be selectively conveyed to a designated reject area based on the output data generated at block 810. This may be performed by additional conveying means (e.g., additional rotary tables, starwheels, rails, etc., as discussed above with reference to FIG. 2), in response to commands generated by the processor(s) 120 executing the sample movement and image capture unit 134, for example.

As another example, the method 800 may include blocks similar to blocks 802 through 806 that occur in parallel with blocks 802 through 806, but for a second vessel/sample (i.e., to increase throughput). In such an embodiment, the method 800 may also include additional blocks in which an additional two-dimensional image (of the stopper edge of the second vessel) is generated and processed, similar to blocks 808 and 810.

Although the systems, methods, devices, and components thereof, have been described in terms of exemplary embodiments, they are not limited thereto. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent that would still fall within the scope of the claims defining the invention.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method for enhancing accuracy and efficiency in automated visual inspection of vessels, the method comprising:

orienting a vessel containing a liquid sample such that a line scan camera has a side view of an edge of a stopper of the vessel;

spinning the vessel;

capturing, by the line scan camera and while spinning the vessel, a plurality of images of the edge of the stopper, wherein each image of the plurality of images is a side view image and corresponds to a different rotational position of the vessel;

wherein the line scan camera is angled upward relative to the horizontal plane to match or approximate a slope of the stopper;

generating, by one or more processors and based on at least the plurality of images, a two-dimensional image of the edge of the stopper; and processing, by one or more processors executing an inference model that includes a trained neural network, pixels of the two-dimensional image to generate output data indicative of a likelihood that the liquid sample is defective, wherein the output data is indicative of whether the liquid sample includes one or more objects of a particular type or types, and wherein the trained neural network is configured to discriminate between gas-filled bubbles and particles in the liquid sample.

2. The method of claim 1, further comprising:

causing, by one or more processors and based on the output data, the vessel to be selectively conveyed to a designated reject area.

3. The method of claim 1, wherein processing the pixels of the two-dimensional image includes applying intensity values associated with different pixels, or other values derived from the intensity values, to different nodes of an input layer of the trained neural network.

4. The method of claim 1, wherein the vessel is a syringe, the stopper is a plunger, and the edge of the stopper is an edge of a plunger dome that contacts the liquid sample.

5. The method of claim 1, wherein orienting the vessel includes one or both of:

conveying the vessel using a motorized rotary table or starwheel; and inverting the vessel such that the stopper is beneath the liquid sample.

6. The method of claim 1, wherein the line scan camera is a first line scan camera, the plurality of images is a first plurality of images, the vessel is a first vessel, and the two-dimensional image is a first two-dimensional image, and wherein the method further comprises:

while orienting the first vessel, also orienting a second vessel such that a second line scan camera has a side view of an edge of a stopper of the second vessel;

while spinning the first vessel, spinning the second vessel;

while capturing the first plurality of images, capturing, by the second line scan camera and while spinning the second vessel, a second plurality of images of the edge of the stopper of the second vessel, wherein each image of the second plurality of images is a side view image and corresponds to a different rotational position of the second vessel; and generating a second two-dimensional image based on at least the second plurality of images.

7. The method of claim 1, further comprising:

prior to processing the pixels of the two-dimensional image, training the neural network using labeled two-dimensional images of stopper edges of vessels.

8. The method of claim 7, comprising training the neural network using labeled two-dimensional images of vessels containing liquid samples that include different types, numbers, sizes and positions of objects.

9. An automated visual inspection system comprising:

a line scan camera;

conveying means for orienting a vessel containing a liquid sample such that the line scan camera has a side view of an edge of a stopper of the vessel;

spinning means for spinning the vessel; and processing means for causing the line scan camera to capture, while the spinning means spins the vessel, a plurality of images of the edge of the stopper, wherein each image of the plurality of images is a side view image and corresponds to a different rotational position of the vessel, wherein the line scan camera is angled upward relative to the horizontal plane to match or approximate a slope of the stopper, generating, based on at least the plurality of images, a two-dimensional image of the edge of the stopper of the vessel, and processing, by executing an inference model that includes a trained neural network, pixels of the two-dimensional image to generate output data indicative of whether the liquid sample is acceptable, wherein the output data is indicative of whether the liquid sample includes one or more objects of a particular type or types, and wherein the trained neural network is configured to discriminate between gas-filled bubbles and particles in the liquid sample.

10. The automated visual inspection system of claim 9, wherein the processing means processes the pixels of the two-dimensional image at least by applying intensity values associated with different pixels, or other values derived from the intensity values, to different nodes of an input layer of the trained neural network.

11. The automated visual inspection system of claim 9, wherein the vessel is a syringe, the stopper is a plunger, and the edge of the stopper is an edge of a plunger dome that contacts the liquid sample.

12. The automated visual inspection system of claim 9, wherein one or both of:

(i) the conveying means includes a motorized rotary table or starwheel, and orients the vessel at least by conveying the vessel using the motorized rotary table or starwheel; and (ii) the conveying means inverts the vessel such that the stopper is beneath the liquid sample.

13. The automated visual inspection system of claim 9, wherein:

the line scan camera is a first line scan camera, the plurality of images is a first plurality of images, the vessel is a first vessel, the liquid sample is a first liquid sample, the conveying means is a first conveying means, the spinning means is a first spinning means, the two-dimensional image is a first two-dimensional image, and the output data is first output data;

the automated visual inspection system further comprises a second line scan camera, a second conveying means, and a second spinning means;

the second conveying means is for, while the first conveying means orients the first vessel, orienting a second vessel such that the second line scan camera has a profile side view of an edge of a stopper of the second vessel;

the second spinning means is for spinning the second vessel while the first spinning means spins the first vessel; and the processing means is further for causing the second line scan camera to capture a second plurality of images of the edge of the stopper of the second vessel while the first line scan camera captures the first plurality of images, generating, based on at least the second plurality of images, a second two-dimensional image of the edge of the stopper of the second vessel, and processing, by executing the inference model, pixels of the second two-dimensional image to generate second output data indicative of whether the second liquid sample is acceptable.

14. An automated visual inspection system comprising: a line scan camera;

sample positioning hardware configured to orient a vessel containing a liquid sample such that the line scan camera has a side view of an edge of a stopper of the vessel, and to spin the vessel while so oriented; and a memory storing instructions that, when executed by one or more processors, cause the one or more processors to cause the line scan camera to capture, while the vessel is spinning, a plurality of images of the edge of the stopper, wherein each image of the plurality of images is a side view image and corresponds to a different rotational position of the vessel, wherein the line scan camera is angled upward relative to the horizontal plane to match or approximate a slope of the stopper, generate, based on at least the plurality of images, a two-dimensional image of the edge of the stopper of the vessel, and process, by executing an inference model that includes a trained neural network, pixels of the two-dimensional image to generate output data indicative of whether the liquid sample is acceptable, wherein the output data is indicative of whether the liquid sample includes one or more objects of a particular type or types, and wherein the trained neural network is configured to discriminate between gas-filled bubbles and particles in the liquid sample.

15. The automated visual inspection system of claim 14, wherein the instructions cause the one or more processors to process the pixels of the two-dimensional image at least by applying intensity values associated with different pixels, or other values derived from the intensity values, to different nodes of an input layer of the trained neural network.

16. The automated visual inspection system of claim 14, wherein the vessel is a syringe, the stopper is a plunger, and the edge of the stopper is an edge of a plunger dome that contacts the liquid sample.

17. The automated visual inspection system of claim 14, wherein one or both of:

(i) the sample positioning hardware includes a motorized rotary table or starwheel, and orients the vessel at least by conveying the vessel using the motorized rotary table or starwheel; and (ii) the sample positioning hardware inverts the vessel such that the stopper is beneath the liquid sample.

* * * * *